United States Patent
Heston

(10) Patent No.: US 6,409,005 B1
(45) Date of Patent: Jun. 25, 2002

(54) CLUTCH CONTROL SYSTEM

(76) Inventor: Michael L. Heston, 7 Arnold Dr., Mansfield, OH (US) 44906

( * ) Notice: Subject to any disclaimer, the term of this patent is extended or adjusted under 35 U.S.C. 154(b) by 0 days.

(21) Appl. No.: 09/630,954

(22) Filed: Aug. 3, 2000

(51) Int. Cl.[7] ............................................ F16D 25/08
(52) U.S. Cl. ................ 192/85 C; 74/501.5 H
(58) Field of Search ................ 192/85 R, 85 C, 192/91 R; 92/137; 74/500.5, 501.5 H, 501.6, 502.4, 502.6; 180/230

(56) References Cited

U.S. PATENT DOCUMENTS

| | | | | |
|---|---|---|---|---|
| 1,806,158 A | * | 5/1931 | Giger ................ | 192/91 R X |
| 2,077,413 A | * | 4/1937 | Hodgkins ............ | 192/91 R |
| 2,216,466 A | * | 10/1940 | Brewer .............. | 192/91 R |
| 3,318,197 A | * | 5/1967 | McNames ............ | 92/137 X |
| 5,020,623 A | * | 6/1991 | Maehara ............ | 74/501.5 H X |
| 5,109,968 A | * | 5/1992 | Pollitt et al. ........ | 74/500.5 X |
| 5,360,381 A | * | 11/1994 | Swist ................ | 477/175 |
| 5,411,448 A | * | 5/1995 | Horii et al. .......... | 477/102 |
| 5,860,892 A | * | 1/1999 | Korenjak et al. ...... | 477/180 |

FOREIGN PATENT DOCUMENTS

JP   61-197826 A  *  9/1986  ............... 192/91 R

* cited by examiner

Primary Examiner—Richard M. Lorence
(74) Attorney, Agent, or Firm—Michael S. Neustel

(57) ABSTRACT

A clutch control system for allowing a motorcycle drag racer to release the clutch while having both hands firmly grasping the handlebars. The inventive device includes an air cylinder having an actuator shaft, a length of air hose fluidly connected to the air cylinder and to a press-urized air tank, a valve within the air hose, a first member attached to the air cylinder having a first slot and a first opening, a second member attached to the distal end of the actuator shaft having a second slot and a second opening, and a control switch in communication with the valve. The first opening and the second opening receiving the distal portions of the adjustment mechanism within the clutch cable. When the control switch is depressed, the valve is opened causing air pressure within the air tank to flow into the air cylinder causing the actuator shaft to separate the first member and the second member which in effect causes a first sheath and a second sheath of the clutch cable to separate to maintain the clutch within an unengaged position. When the control switch is released, the valve is closes and an exhaust port is opened to allow air pressure within the air cylinder to be released allowing the sheaths of the clutch cable to retract toward one another thereby allowing the clutch to be engaged.

11 Claims, 5 Drawing Sheets

CLUTCH CONTROL SYSTEM

BACKGROUND OF THE INVENTION

1. Field of the Invention

The present invention relates generally to motorcycle clutches and more specifically it relates to a clutch control system for allowing a motorcycle drag racer to release the clutch while having both hands firmly grasping the handlebars.

2. Description of the Prior Art

Motorcycle clutch systems have been in use for years. Typically, a clutch system for a motorcycle is comprised of a clutch handle pivotally attached to the handle bars of the motorcycle, and a clutch cable connected between the clutch handle and the clutch lever wherein the clutch lever opens and closes the clutch of the motorcycle.

The main problem with conventional motorcycle clutch systems is that the rider is required to remove a portion of their left hand at the starting line to retain the clutch handle in the open position. Another problem is that conventional motorcycle clutch systems require the rider to manually release the clutch handle with a portion of their hand while significant forces are being applied to the rider with the motorcycle proceeding forwardly.

Examples of patented clutch related devices include U.S. Pat. No. 4,505,364 to Goucher et al.; U.S. Pat. No. 5,996,752 to Froehlich; U.S. Pat. No. 5,603,674 to Rivas et al.; U.S. Pat. No. 5,928,106 to Biros, Jr. et al.; U.S. Pat. No. 5,363,946 to Chang; U.S. Pat. No. 3,896,914 to Konsbruck et al.; U.S. Pat. No. 3,435,929 to Thompson which are all illustrative of such prior art.

While these devices may be suitable for the particular purpose to which they address, they are not as suitable for allowing a motorcycle drag racer to release the clutch while having both hands firmly grasping the handlebars. Conventional motorcycle clutch systems simply do not allow the rider of the motorcycle to easily engage the clutch without positioning one of their hands in an awkward position.

In these respects, the clutch control system according to the present invention substantially departs from the conventional concepts and designs of the prior art, and in so doing provides an apparatus primarily developed for the purpose of allowing a motorcycle drag racer to release the clutch while having both hands firmly grasping the handlebars.

SUMMARY OF THE INVENTION

In view of the foregoing disadvantages inherent in the known types of motorcycle clutches now present in the prior art, the present invention provides a new clutch control system construction wherein the same can be utilized for allowing a motorcycle drag racer to release the clutch while having both hands firmly grasping the handlebars.

The general purpose of the present invention, which will be described subsequently in greater detail, is to provide a new clutch control system that has many of the advantages of the motorcycle clutches mentioned heretofore and many novel features that result in a new clutch control system which is not anticipated, rendered obvious, suggested, or even implied by any of the prior art motorcycle clutches, either alone or in any combination thereof.

To attain this, the present invention generally comprises an air cylinder having an actuator shaft, a length of air hose fluidly connected to the air cylinder and to a pressurized air tank, a valve within the air hose, a first member attached to the air cylinder having a first slot and a first opening, a second member attached to the distal end of the actuator shaft having a second slot and a second opening, and a control switch in communication with the valve. The first opening and the second opening receiving the distal portions of the adjustment mechanism within the clutch cable. When the control switch is depressed, the valve is opened causing air pressure within the air tank to flow into the air cylinder causing the actuator shaft to separate the first member and the second member which in effect causes a first sheath and a second sheath of the clutch cable to separate to maintain the clutch within an unengaged position. When the control switch is released, the valve is closes and an exhaust port is opened to allow air pressure within the air cylinder to be released allowing the sheaths of the clutch cable to retract toward one another thereby allowing the clutch to be engaged.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a clutch control system that will overcome the shortcomings of the prior art devices.

A second object is to provide a clutch control system for allowing a motorcycle drag racer to release the clutch while having both hands firmly grasping the handlebars.

Another object is to provide a clutch control system that allows a motorcycle rider to engage the clutch by simply pushing a button.

An additional object is to provide a clutch control system that can be attached to most existing motorcycle clutch systems.

A further object is to provide a clutch control system that is easy to install upon a motorcycle clutch system.

Another object is to provide a clutch control system that utilizes a conventional clutch cable.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
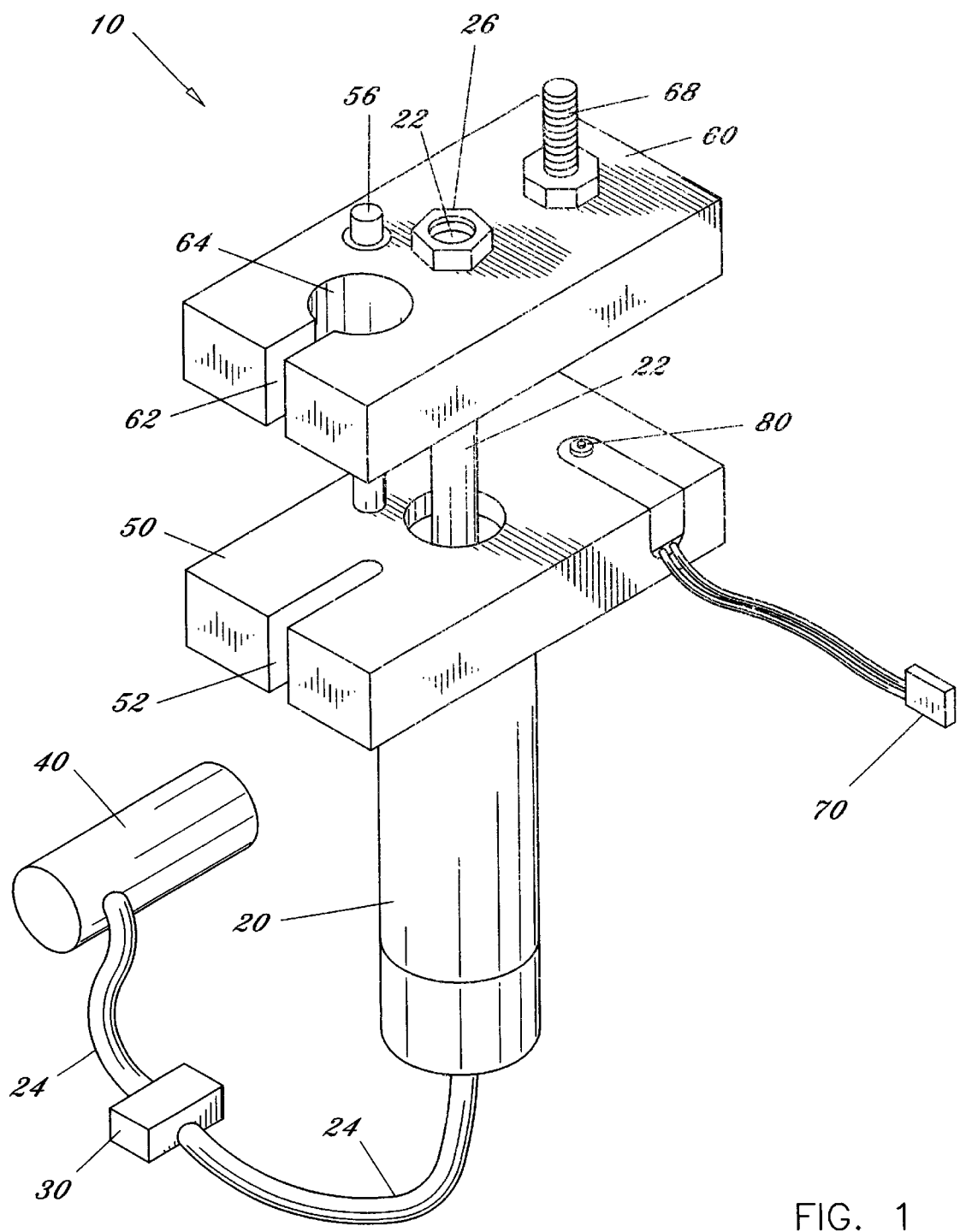
FIG. 1 is an upper perspective view of the present invention inverted in an open position.
Figure 2:
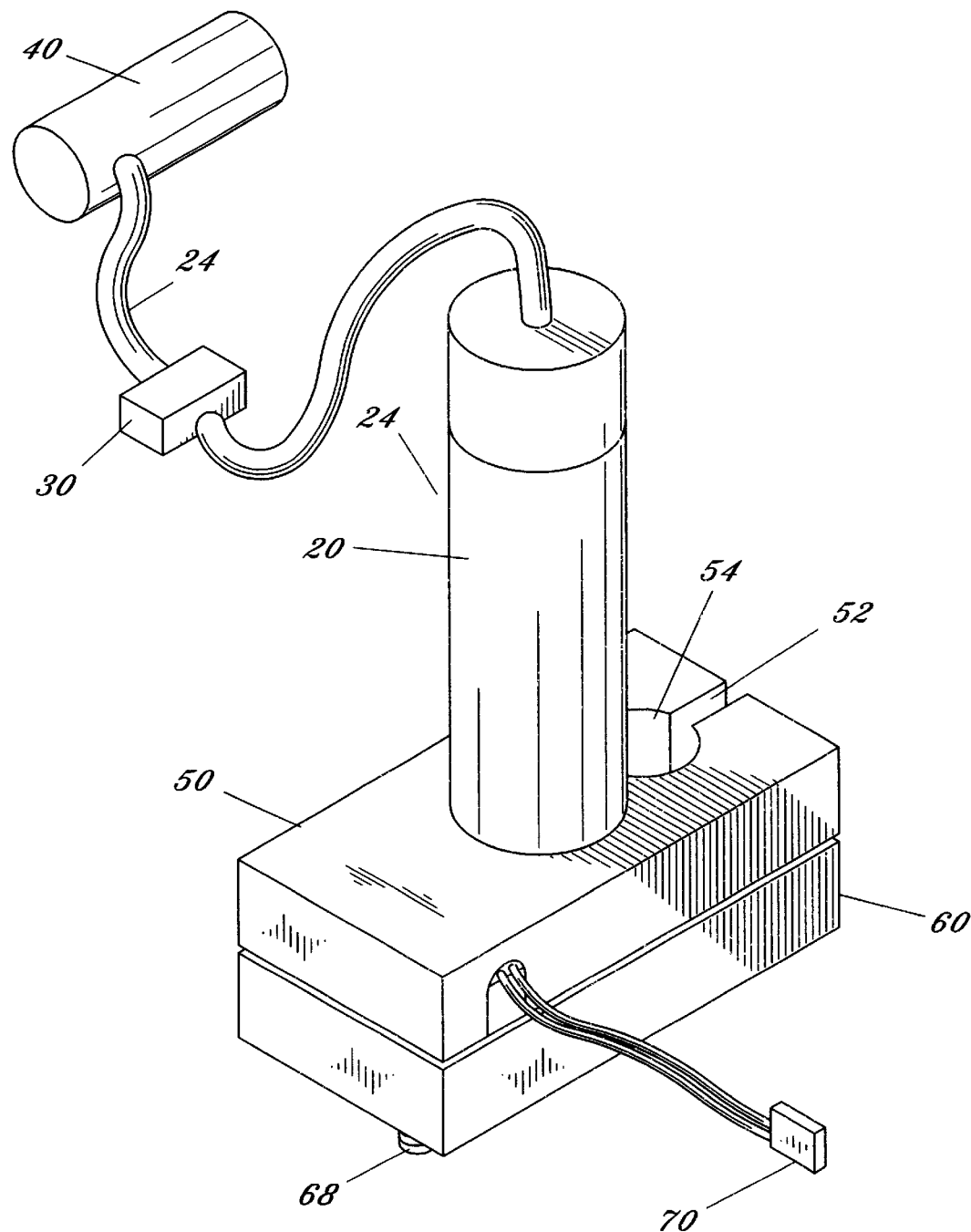
FIG. 2 is an upper perspective view of the present invention in a closed position.

Turning now descriptively to the drawings, in which similar reference characters denote similar elements throughout the several views, FIGS. 1 through 5 illustrate a clutch control system 10, which comprises an air cylinder 20 having an actuator shaft 22, a length of air hose 24 fluidly connected to the air cylinder 20 and to a pressurized air tank 40, a valve 30 within the air hose 24, a first member 50 attached to the air cylinder 20 having a first slot 52 and a first opening 54, a second member 60 attached to the distal end of the actuator shaft 22 having a second slot 62 and a second opening 64, and a control switch 70 in communication with the valve 30. The first opening 54 and the second opening 64 receiving the distal portions of the adjustment mechanism within the clutch cable 12. When the control switch 70 is depressed, the valve 30 is opened causing air pressure within the air tank 40 to flow into the air cylinder 20 causing the actuator shaft 22 to separate the first member 50 and the second member 60 which in effect causes a first sheath 14 and a second sheath 16 of the clutch cable 12 to separate to maintain the clutch within an unengaged position. When the control switch 70 is released, the valve 30 is closes and an exhaust port is opened to allow air pressure within the air cylinder 20 to be released allowing the sheaths of the clutch cable 12 to retract toward one another thereby allowing the clutch to be engaged.

A conventional motorcycle clutch system is comprised of a clutch handle pivotally attached to the handle bars of the motorcycle, and a clutch cable 12 connected between the clutch handle and the clutch lever wherein the clutch lever opens and closes the clutch of the motorcycle. The clutch cable 12 typically includes an adjustment mechanism within that allows the user to adjust the effective length of the elongate cable 18 within the clutch cable 12. The adjustment mechanism separates the sheath surrounding the elongate cable 18 into a first sheath 14 and a second sheath 16.

The user adjusts the effective length and position of the elongate cable 18 within the sheath 14, 16 by manipulating the length of the adjustment mechanism.

As shown in FIGS. 1 through 5 of the drawings, the present invention includes an air cylinder 20 having an actuator shaft 22 extending longitudinally from thereof. The air cylinder 20 includes a rear port that is fluidly connected to an elongate air hose 24 as shown in FIGS. 1 through 5 of the drawings. The elongate hose is fluidly connected to a pressurized air tank 40 for applying pressurized air to the air cylinder 20 thereby extending the actuator shaft 22.

As further shown in FIGS. 1 through 5 of the drawings, a first member 50 is attached to the air cylinder 20 allowing the actuator shaft 22 to freely pass through. The first member 50 may have any shape and structure. A first slot 52 extends into a side of the first member 50 for receiving the elongate cable 18 during installation and operation. A first opening 54 extends into the first member 50 for receiving the distal portion of the first sheath 14 as shown in FIGS. 2 through 5 of the drawings. The first opening 54 is formed for snugly receiving the first sheath 14 to prevent accidental removal of the first sheath 14. The first slot 52 is formed to allow the elongate cable 18 to freely pass through during installation and operation.

As further shown in FIGS. 1 through 5 of the drawings, a second member 60 is attached to the distal end of the actuator shaft 22 of the air cylinder 20 by a locking nut 26 or other well-known securing means. The second member 60 and the first member 50 have opposing inner surfaces that are formed to become adjacent to one another. The second member 60 may have any shape and structure. A second slot 62 extends into a side of the second member 60 for receiving the elongate cable 18 during installation and operation. A second opening 64 extends into the second member 60 for receiving the distal portion of the second sheath 16 as shown in FIGS. 2 through 5 of the drawings. The second opening 64 is formed for snugly receiving the second sheath 16 to prevent accidental removal of the second sheath 16. The second slot 62 is formed to allow the elongate cable 18 to freely pass through during installation and operation.

Figure 4:
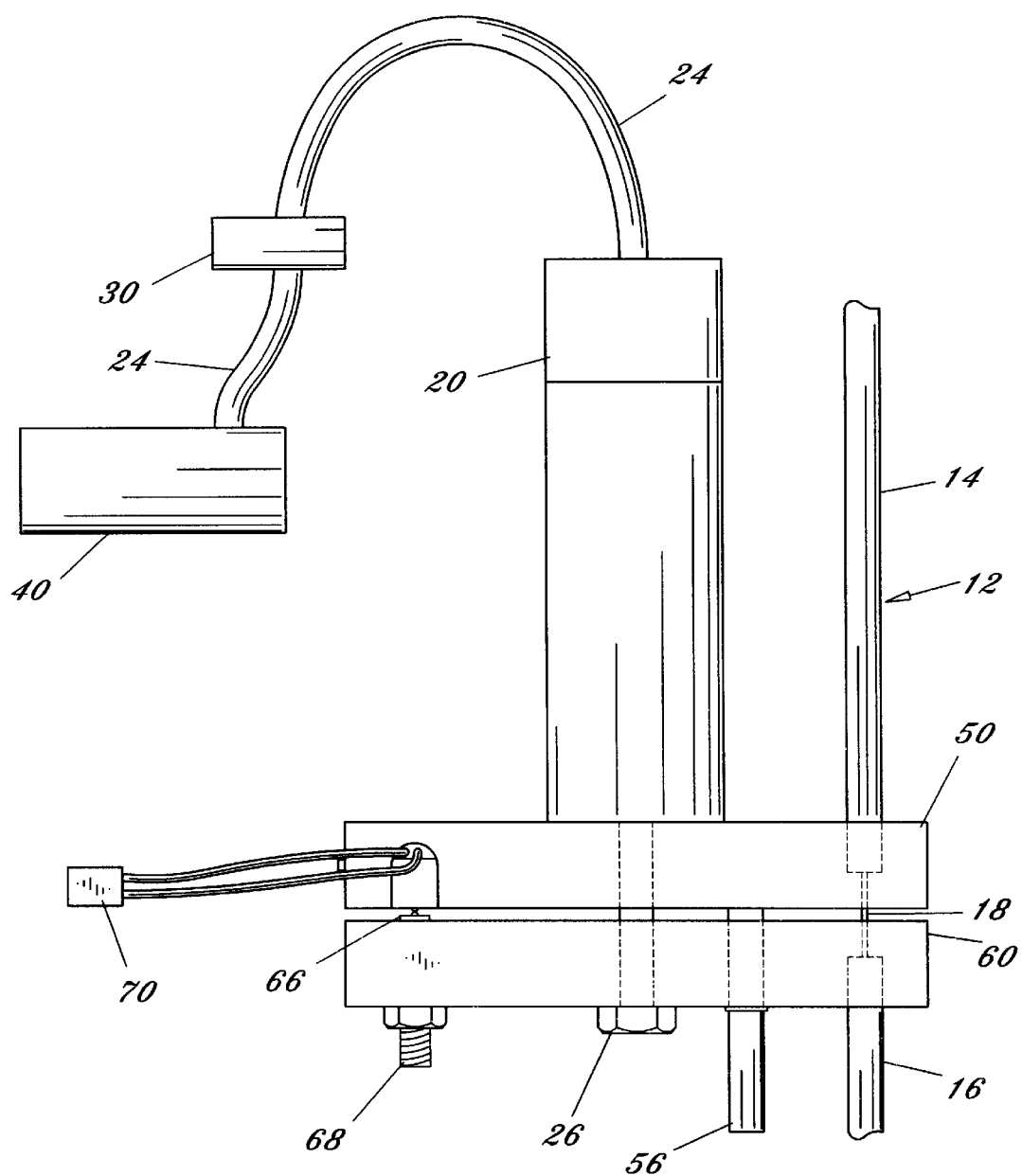
FIG. 4 is a side view of the present invention attached to a clutch cable in the closed position.
Figure 5:
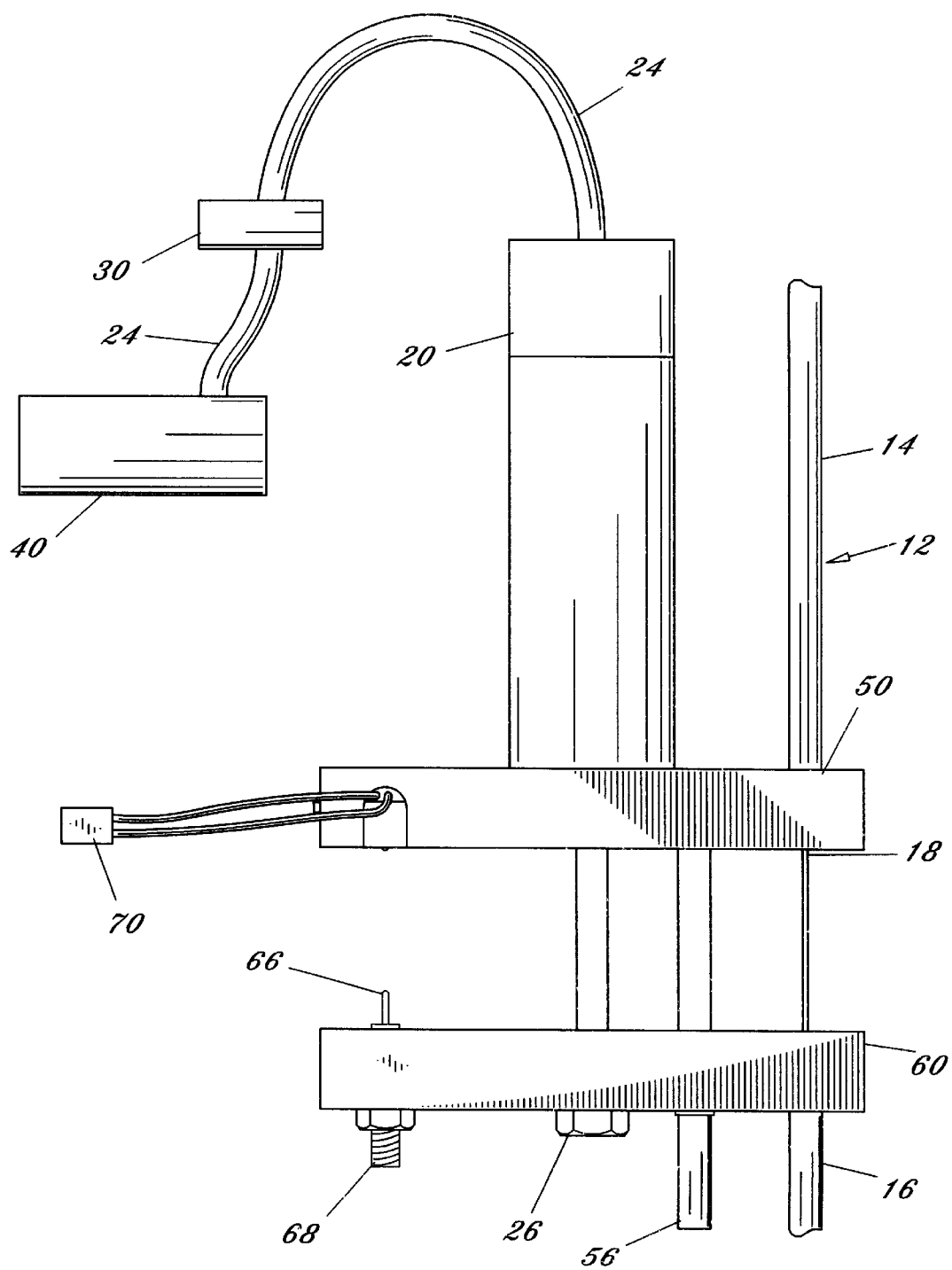
FIG. 5 is a side view of the present invention attached to a clutch cable in the open position.

As shown in FIGS. 1, 4 and 5 of the drawings, a guide shaft 56 extends from an inner surface of the first member 50 and slidably passes through the second member 60 to maintain the second member 60 in an aligned position with the first member 50. The guide shaft 56 is long enough to remain engaged within the second member 60 when the actuator shaft 22 is fully extended.

As further shown in FIGS. 1 through 5 of the drawings, a valve 30 is fluidly connected within the air hose 24 between the air cylinder 20 and the air tank 40. The valve 30 is a three-way valve 30 having an inlet port fluidly connected to the air tank 40, an exhaust port, and an outlet port fluidly connected to the air cylinder 20. The valve 30 has a "first state" wherein the exhaust port is fluidly connected to the outlet port with the inlet port closed for allowing pressurized air within the air cylinder 20 to be removed. The valve 30 also has a "second state" wherein the inlet port is fluidly connected to the outlet port with the exhaust port closed for allowing pressurized air from within the air tank 40 to enter the air cylinder 20 thereby extending the actuator shaft 22.

As further shown in FIGS. 1 through 5 of the drawings, a control switch 70 is in communication with the valve 30 thereby controlling the state the valve 30 is in. The control switch 70 is preferably secured to the handlebar of the motorcycle adjacent the clutch handle on the left side of the handlebar. The control switch 70 is normally within an open state thereby placing the valve 30 into the first state to allow the pressurized air within the air cylinder 20 to escape. When the control switch 70 is closed by the user depressing the control switch 70 the valve 30 is manipulated into the second state thereby allowing pressurized air to pass to the air cylinder 20.

Figure 3:
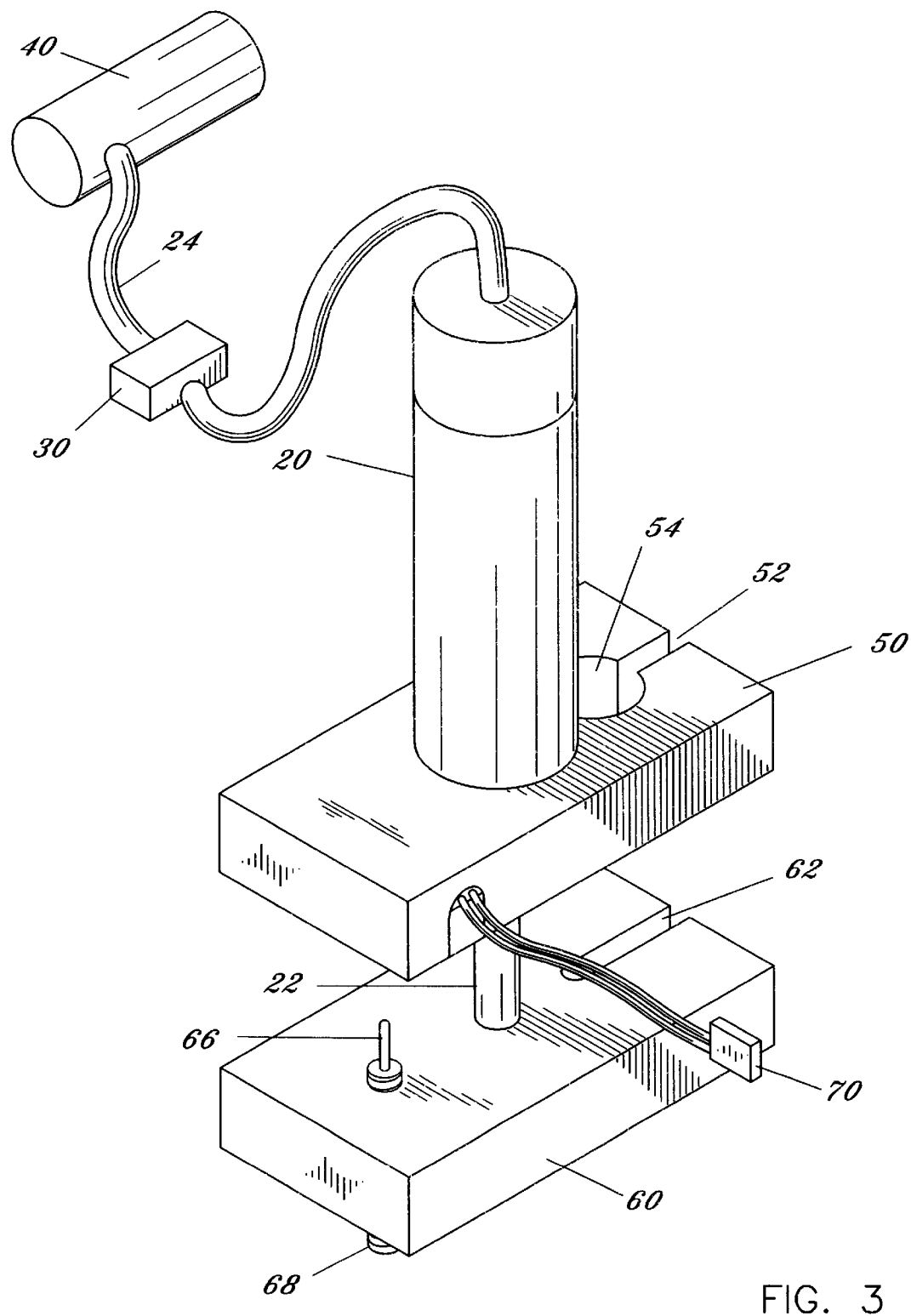
FIG. 3 is an upper perspective view of the present invention in an open position.

As best shown in FIG. 3 of the drawings, a spring loaded shaft 66 attached to an adjusting member 68 is positioned within the second member 60. A pressure switch 80 positioned within the first member 50 detects when the distal end of the spring loaded shaft 66 engages the pressure switch 80 thereby actuating a low side rev limiter within the motorcycle for when the clutch is unengaged to prevent the engine from over revving.

In use, the user positions the first member 50 and the second member 60 between the first sheath 14 and the second sheath 16 of the clutch cable 12 within the adjustment mechanism. The user positions the first sheath 14 into the first opening 54 and the second sheath 16 into the second opening 64 with the elongate cable 18 freely passing through the slots 52, 62. After the user has started the motorcycle engine and has positioned the motorcycle at the starting line for a race, the user then draws the conventional clutch handle inwardly thereby manipulating the clutch into an unengaged position to prevent movement of the motorcycle. With the clutch handle positioned inwardly, the user then engages the control switch 70 thereby causing the valve 30 to enter the second state wherein pressurized air enters the air cylinder 20. The user then releases the clutch handle and the actuator shaft 22 of the air cylinder 20 is able to extend outwardly to separate the second member 60 from the first member 50 to extend the effective length of the sheath 14, 16 of the clutch cable 12 which in effect retains the clutch of the motorcycle within the unengaged position by maintaining the elongate cable 18 within the desired position. When the user of the motorcycle desires to release the clutch into an engaged position, the user simply releases the control switch 70 which places the valve 30 into the first state which allows pressurized air within the air cylinder 20 to escape through the exhaust port of the valve 30. The actuator shaft 22 is retracted into the air cylinder 20 by the first sheath 14 and the second sheath 16 coming together until the first member 50 and the second member 60 engage one another. The above process is repeated when desired by the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A clutch control system for allowing a motorcycle rider to engage a clutch with both hands firmly grasping the handlebars, comprising:

an air cylinder having an actuator shaft, wherein said air cylinder is fluidly connected to a pressurized air source;

a first member attached to said air cylinder formed for receiving a first sheath of a clutch cable;

a second member attached to a distal end of said actuator shaft formed for receiving a second sheath of said clutch cable; and a means for controlling said air cylinder for selectively extending said actuator shaft.

2. The clutch control system of claim 1, wherein said means for controlling comprises:

a valve fluidly positioned between said air cylinder and said pressurized air source; and a control switch in communication with said valve for controlling said valve.

3. The clutch control system of claim 2, wherein said valve has an inlet port fluidly connected to said pressurized air source, an exhaust port, and an outlet port fluidly connected to said air cylinder.

4. The clutch control system of claim 3, wherein said valve has a first state wherein said exhaust port is fluidly connected to said outlet port and wherein said inlet port is closed.

5. The clutch control system of claim 4, wherein said valve has a second state wherein said inlet port is fluidly connected to said outlet port and wherein said exhaust port is closed.

6. The clutch control system of claim 5, wherein when said control switch is open said valve is within said first state, and wherein when said control switch is closed said valve is within said second state.

7. The clutch control system of claim 6, including a pressure switch positioned within said first member for detecting when said clutch is engaged or unengaged for activating a low side rev limiter.

8. The clutch control system of claim 1, wherein said first member includes:

a first slot extending into a side of said first member for slidably receiving an elongate cable of said clutch cable; and a first opening for receiving said first sheath of said clutch cable.

9. The clutch control system of claim 8, wherein said second member includes:

a second slot extending into a side of said second member for slidably receiving an elongate cable of said clutch cable; and a second opening for receiving said second sheath of said clutch cable.

10. The clutch control system of claim 9, wherein said first opening is aligned with said second opening along a longitudinal path of said elongate cable.

11. The clutch control system of claim 1, including a guide shaft extending from said first member and slidably extending through said second member for maintaining said second member in a constant rotational position with respect to said first member.

* * * * *